United States Patent
Bolger et al.

(10) Patent No.: US 6,674,825 B2
(45) Date of Patent: Jan. 6, 2004

(54) DETERMINATION OF OPERATING LIMIT MINIMUM CRITICAL POWER RATIO

(75) Inventors: Francis Thomas Bolger, Wilmington, NC (US); Jens Georg Munthe Andersen, Wilmington, NC (US); Charles Lee Heck, Wilmington, NC (US); James Courtney Shaug, Morgan Hill, CA (US)

(73) Assignee: Global Nuclear Fuel - Americas, L.L.C., Wilmington, NC (US)

( * ) Notice: Subject to any disclaimer, the term of this patent is extended or adjusted under 35 U.S.C. 154(b) by 31 days.

(21) Appl. No.: 10/106,372

(22) Filed: Mar. 27, 2002

(65) Prior Publication Data

US 2003/0002613 A1 Jan. 2, 2003

Related U.S. Application Data

(62) Division of application No. 09/750,289, filed on Dec. 29, 2000.

(51) Int. Cl.[7] ................................................. G21C 7/36
(52) U.S. Cl. ........................ 376/216; 376/259; 376/277
(58) Field of Search ................................ 376/215, 216, 376/217, 218, 254, 255, 241, 242

(56) References Cited

U.S. PATENT DOCUMENTS

| | | | |
|---|---|---|---|
| 5,091,139 A | * | 2/1992 | Chao et al. ................... 376/216 |
| 5,631,939 A | | 5/1997 | Haraguchi et al. |
| 5,790,616 A | | 8/1998 | Jackson |
| 5,790,618 A | | 8/1998 | Fawks, Jr. |
| 5,912,933 A | | 6/1999 | Shaug et al. |
| 5,923,717 A | | 7/1999 | Fawks, Jr. |
| 5,975,737 A | | 11/1999 | Crater et al. |
| 6,343,106 B1 | * | 1/2002 | Hiraiwa ....................... 376/277 |

FOREIGN PATENT DOCUMENTS

| EP | 1178417 | 2/2002 | ................... 341/50 |
|---|---|---|---|
| WO | WO 98/27505 | 6/1998 | ................... 341/50 |

OTHER PUBLICATIONS

Ansari et al., Prediction of GE–Atlas Transient Boiling Transition Data Using RETRAN–02/RETRAN–15F, Nuclear Technology, vol. 61, pp. 205–211.*
Scatena et al., "Application of Statistical Techniques in Reload Licensing," Tansactions of the American Nuclear Society, vol. 45, 1983, pp. 692–693.*
Aceil et al., "Sesitivity Analysis of Thermal–Hydraulic Parameters and Probaility Estimation of Boiling Transiction in a Standard BWR/6", Nuclear Technology, vol. 93, Feb. 1991, pp. 123–130.*
Mata et al., "COFRENTES Reload Licensing Methodology with RETRAN–03," Nuclear Technology, vol. 121, Mar. 1998, pp. 275–288.*
"The Space Shuttle Clickable Map", Joshua S. Mussaf, Student Space Awareness, pp. 1, Apr. 1, 2001.
"Making A Clickable Image Map", ECN No Name Newsletters, Online!, Cathy Curry, pp. 1–3, May 1995.
"Water Treatment Site Monitored Live On Internet", Engineeringtalk, pp. 1–2, Sep. 14, 2000.
International Search Report dated Mar. 18, 2003.

* cited by examiner

Primary Examiner—Michael J. Carone
Assistant Examiner—Rick Palabrica
(74) Attorney, Agent, or Firm—Nixon & Vanderhye P.C.

(57) ABSTRACT

A method and system for thermal-dynamic modeling and performance evaluation of a nuclear Boiling Water Reactor (BWR) core design is presented. Based on a predetermined generic transient bias and uncertainty distribution in the change in critical power ratio ($\Delta$CPR/ICPR), shifted histograms of fuel rod critical power ratio (CPR) are generated. Ultimately, the operating limit minimum critical power ratio (OLMCPR) of the reactor is directly evaluated from a shifted histogram of fuel rod CPRs for a particular set of initial conditions which result in a probability calculation representing the number of fuel rods subject to a boiling transition (NRSBT) during the transient condition being equal to a predetermined value.

5 Claims, 8 Drawing Sheets

FIG. 1
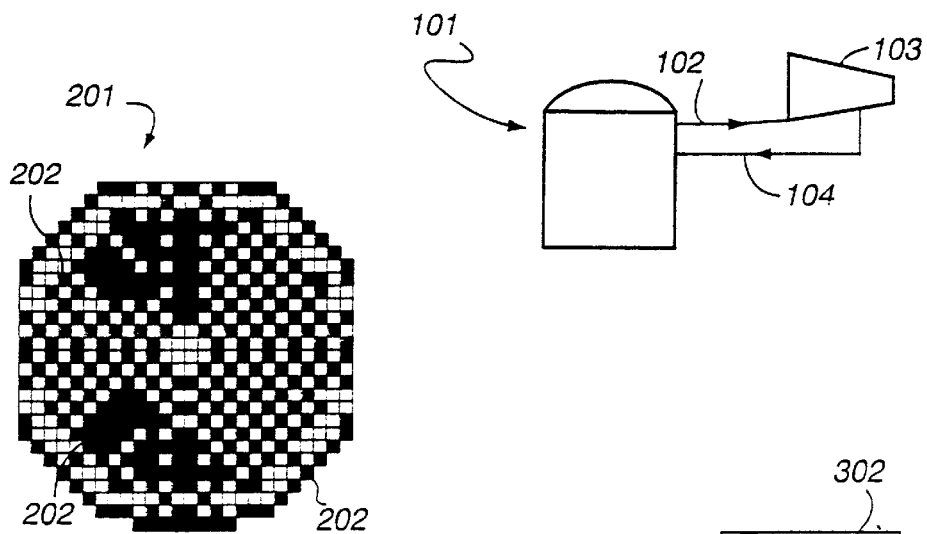
FIG. 2
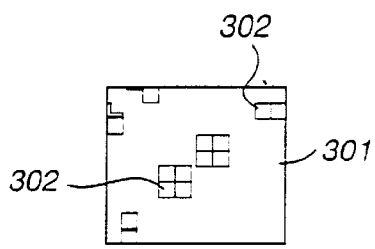
FIG. 3
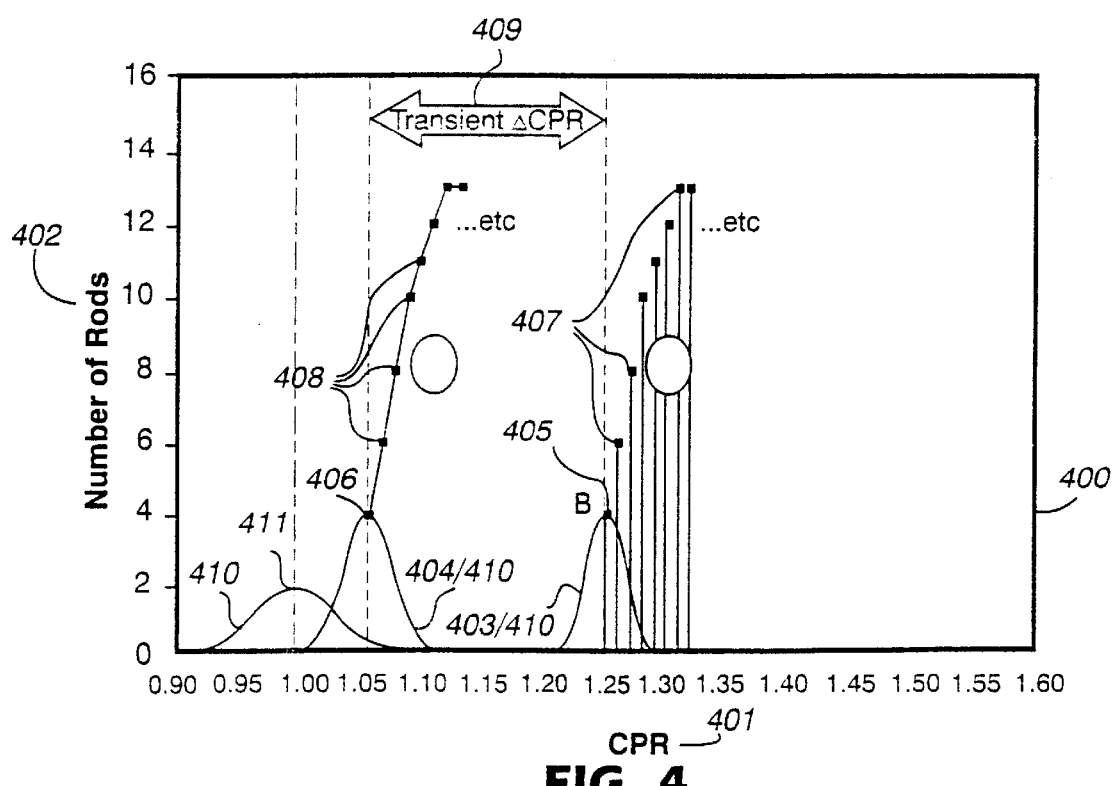
FIG. 4

DETERMINATION OF OPERATING LIMIT MINIMUM CRITICAL POWER RATIO

This application is a division of application Ser. No. 09/750,289, filed Dec. 29, 2000.

FIELD OF THE INVENTION

The present invention relates generally to methods for evaluating nuclear power core operation, and more particularly to an improved method and apparatus for determining an operating limit minimum critical power ratio (OLMCPR) so as to effectuate increased efficiency and operation of Boiling Water Reactors (BWR).

BACKGROUND OF THE INVENTION

A Boiling Water Nuclear Reactor (BWR) generates power from a controlled nuclear fission reaction. As shown in FIG. 1, a simplified BWR includes a reactor chamber 101 that contains a nuclear fuel core and water. Generated steam is transferred through pipe 102 to turbine 103, where electric power is generated, then water returns to the core through pipe 104. As shown in FIG. 2, the core 201 is made of approximately five hundred (500) bundles 202 of fuel rods arranged in a specific manner within the reactor core. As shown in FIG. 3, each bundle 301 contains roughly one hundred (100) fuel rods 302. Water in the core surrounds the rods. Heat generated by a nuclear reaction is transferred from the rods to the water circulating through the core, boiling some of the water. The heat generated in the core is carefully controlled to maintain safe and efficient reactor operations.

In a Boiling Water Nuclear Reactor there are basically three modes of heat transfer that must be considered in defining thermal limits for the reactor: (i) N ideate boiling, (ii) transition boiling and (iii) film boiling. "Nucleate boiling" is the preferred efficient mode of heat transfer in which the BWR is designed to operate. "Transition boiling" is manifested by an unstable fuel rod cladding surface temperature which rises suddenly as steam blanketing of the heat transfer surface on the rod occurs, then PS to the nucleate boiling temperance as the steam blanket is swept away by the coolant flow, and then rises again. At still higher fuel rod/bundle operating powers, "film boiling" occurs which results in higher fuel rod cladding temperatures. The cladding temperature in film boiling, and possibly the temperature peaks in transition boiling, may reach values which could cause weakening of the rod cladding and accelerated corrosion. Fuel rod overheating is conservatively defined as the onset of the transition from nucleate boiling to film boiling. The conventional basis for reactor core and fuel rod design is defined such that some "margin," accommodating various design and operational "uncertainties," is maintained between the most limiting operating condition and the transition boiling condition at all times for the life of the core.

The onset of transition boiling can be predicted by a correlation to the steam quality at which boiling transition occurs-called the "critical quality." Steam quality can be readily measured and is generally a function of measuring distance above the boiling boundary (boiling length) for any given mass flow rate, power level, pressure and bundle flow geometry among other factors. A "critical power" is defined as that bundle power which would produce the critical quality of steam. Accordingly, a "critical power ratio" (CPR) is defined as the ratio of the critical power to the bundle operating power at the reactor condition of interest. CPR is descriptive of the relationship between normal operating conditions and conditions which produce a boiling transition. CPR is conventionally used to rate reactor design and operation. To assure a safe and efficient operation of the reactor, the CPR is kept above a prescribed value for all of fuel assemblies in the core. Reactor operating limits are conventionally defined in terms of the most limiting fuel bundle assembly in the core—defined as the "minimum critical power ratio" (MCPR). Reactor operating limits are often stated in terms of MCPR.

In nuclear power generation engineering, it is widely recognized that there is a possibility, however small, that the occurrence of a reactor transient event combined with the various "uncertainties" and tolerances inherent in reactor design and operation may cause transition boiling to exist locally at a fuel rod for some period of time. Accordingly, MCPR operating limits are conventionally set in accordance with the United States Nuclear Regulatory Commission (USNRC) design basis requirement that transients caused by a single operator error or a single equipment malfunction shall be limited such that, taking into consideration uncertainties In the core operating state, more than 99.9% of the fuel rods are expected to avoid boiling transition during that error or malfunction. A safety limit minimum critical power ratio (SLMCPR) defined under current USNRC requirements as the MCPR where no more than 0.1% of the fuel rods are subject to boiling transition (also known as NRSBT for Number of Rods Subject to Boiling Transition). The corresponding OLMCPR describes the core operating conditions such that the MCPR is not lower than the SLMCPR to a cc in statistical confidence.

i. An Ideal Approach

In principle, the OLMCPR could be calculated directly such that for the limiting anticipated operational occurrence (AOO), less than 0.1% of the rods in the core would be expected to experience boiling transition. This approach is described in U.S. Pat. No. 5,912,933, by Shaug et at. The process involved is shown in FIG. 4, which depicts histogram 40 of rod CPR values 401 versus number of rods 402 at the specific CFR value. While the CPR value is usually associated with a fuel bundle, it actually refers to the limiting rod in a bundle. Each rod in the bundle has a CPR value at is determined by the local power distribution and relative position of the rod within e bundle (R-factor). The lowest CPR of any one rod in the bundle Is used to characterize the CPR for the entire bundle.

The CPR 401 for a given rod has an associated probability distribution function (PDF) which reflects the uncertainties in its determination. The PDF may be determined experimentally and is shown as an Experimental Critical Power Ratio (ECPR) distribution 410. Thus, if a nominal CPR value (411) is 1.0, then the PDF 410 of probable actual CPR values range from 0.90 to 1.10. The variability in the rod CPR values is due to uncertainties in the initial rod condition, i.e., uncertainties in the measurements of parameters at the reactor operating state (core power) and in the modeling of derived parameters (power distribution).

To take the effect of a transient event on the CPR values into account, a safety margin is introduced to CPR values by shifting the acceptable nominal CPR value 405 for the lowest rod CPR to a larger CPR value, i.e., 1.25. The ECPR histogram distribution 403 for the lowest CPR rod is thus shifted such that the entire CPR histogram is above a CPR value of 1.20, and well above a CPR value of 1.0. Moreover, the nominal CPR values 407 for rods other than the lowest CPR rod are above the nominal CPR value, e.g., 1.25, of the lowest CPR rod.

During a transient in rod operation, the histogram 407 of rod CPRs shifts to the left to lower CPR values, resulting in the histogram 408. With this shift, the "nominal" CPR value 406 during the transient is at the point, e.g., 1.05, where the minimum CPR value is reached during the transient. The limiting rod will have an associated PDF 404, which includes both the uncertainties in the initial rod conditions and "transient uncertainties." The maximum change in critical power ratio during the transient ($\Delta$CPR 409) includes uncertainties in the modeling of the transient, both the physical models and plant parameters.

Ideally, this transient $\Delta$CPR 409 and associated OLMCPR would be generated as shown in FIG. 5, and described as follows:

Step 1: Assume a set of base core operating conditions using the parameters to run the plant that generates a core MCPR equal to the OLMCPR, as shown by block 501.

Step 2: Using the parameters, such as core power, core flow, core pressure and others, that predict a general bundle CPR set forth in block 506, determine the MCPR for each bundle in the core, as shown by block 502.

Step 3: Using parameters, such as rod placement within each bundle and rod power, that change each bundle CPR into individual rod CPR values set forth in block 507, determine the MCPR for each rod in the core, as shown by block 503.

Step 4: Using the ECPR probability distribution, generated by Equations 1 and 2, set forth in block 508, determine the percentage of NRSBT in the core by summing the probabilities of each rod in the core that is subject to boiling transition, as shown by block 504. This summation is shown by Equation 3.

$$ECPR = \frac{(CriticalPower \text{ Predicted by Correlation})}{(\text{Measured } CriticalPower)} \quad \text{(Equation 1)}$$

$$P_1 = P(z_i) = \frac{1}{\sqrt{2\pi}} \int_{z_i}^{\infty} e^{-\frac{1}{2}u^2} du \quad \text{(Equation 2)}$$

$$NRSTB\,(\%) = \frac{100}{N_{rod}} \times \sum_{i=1}^{N_{rod}} [P_1 \times (1Rod)] \quad \text{(Equation 3)}$$

Step 5: Vary the parameters set forth in blocks 506 and 507 for a set number of Monte Carlo statistical trials, as shown by block 505. Compile the statistics from all the trials from steps 2 through 4 to generate a probability distribution of NRSBT.

Step 6: Compare the value of NRSBT percentage to 0.1%, as shown in block 509. If the percentage is greater than 0.1%, reset the core parameters to different initial conditions in order to comply with the USNRC regulations, as shown in block 510. Similar to Step 1 and block 501, the new initial conditions are assumed to generate an OLMCPR. The determination of NRSBT restarts and loops until the value of NRSBT is equal to 0.1%. Similarly, if the percentage is less than 0.1%, the core parameters are reset to increase the value of NRSBT in order to operate the core more efficiently or with fewer effluents.

Step 7: If the percentage of NRSBT equals 0.1%, the assumed value of OLMCPR, which equals core MCPR, complies with the USNRC regulations, as shown by block 511. Accordingly, the operating core conditions are set as the assumed parameters.

Because of the computational difficulties and the need to evolve efficient algorithms, the ideal process outlined above has not been followed. The currently approved process and the new approach to determining the OLMCPR are described in the following sections.

ii. The USNRC Approved Approach

In the current process, the OLMCPR determination is divided into primarily two steps, as shown by FIG. 6. Using a process similar to the ideal process, first the SLMCPR is determined so that less than 0.1% of the rods in the core will be expected to experience boiling transition at this value. In other words, 99.9% of the fuel rods in the core will be expected to avoid boiling transition if the MCPR in the core is greater than SLMCPR. Second, the OLMCPR is then established by summing the maximum change in MCPR ($\Delta$CPR$_{95/95}$) expected from the most limiting transient event and the SLMCPR.

Since FIG. 6 is similar to the FIG. 4, only a brief description of its components follows. Histogram 600 shows the number of rods at a specific CPR value 602 versus the corresponding CPR value 601. The histogram 608 results with the lowest CPR rod 607 at a value of, e.g., 1.05, which equals the SLMCPR 603. Limiting rod distribution 606 shows the uncertainty in determination of the limiting CPR rod 607. Similar to the ideal process, the SLMCPR 603 is determined when the percentage of NRSBT is equal to 0.1%.

However, unlike the ideal process, the current process is unable to fully predict and measure certain parameters, such as the power distribution within each bundle and the power distribution along each rod. Thus, the uncertainties in calculating the SLMCPR do not allow equating the OLMCPR with the SLMCPR. Accordingly, an error factor, $\Delta$CPR$_{95/95}$ 605, is linearly added to the SLMCPR 603 to determine the OLMCPR 609. $\Delta$CPR$_{95/95}$ 605 conservatively corrects for the inherent limitations in the calculation of the SLMCFR 603.

Using the currently approved process, the OLMCPR 609 is generated as shown in FIG. 7, and described as follows:

Step 1: Assume a set of base core operating conditions using the parameters to run the plant generates a core MCPR equal to the SLMCPR as shown by block 701.

Step 2: Using the parameters, such as core power, core flow, core pressure, bundle power and others, that predict a general bundle CPR set forth in block 706, determine the MCPR for each bundle in the core as shown by block 702. This process step has large uncertainties in predicting the bundle power, biasing the calculations.

Step 3: Using parameters, such as rod placement within each b die and rod power, which change each bundle CPR into individual rod CPR values set forth in block 707, determine the MCPR for each rod in the core, as shown by block 703. Individual rod power is difficult to measure; combining that uncertainty with bundle power distribution uncertainty serves to increase the uncertainty in practical calculations of the SLMCPR.

Step 4: Using the ECPR probability distribution set forth in block 708, generated by Equations 1 and 2 shown above, determine the percentage of NRSBT in the core by summing the probabilities of each rod in the core that is subject to boiling transition, as shown by block 704. This summation is performed using Equation 3, shown above.

Step 5: Vary the parameters set forth in blocks 706 and 707 for a set number of Monte Carlo statistical trials, as shown by block 705. Compile the statistics from all the trials from steps 2 through 4 to generate a probability distribution of NRSBT.

Step 6: Compare the value of percentage of NRSBT to 0.1%, as shown in block 709. If the percentage is greater than 0.1%, reset the core parameters to different initial conditions in order to comply with the USNRC regulations, as shown in block 710. Similar to Step 1 and block 701, the new initial conditions are assumed to generate the SLM-CPR. The determination of NRSBT loops until the value of NRSBT is equal to 0.1%. Similarly, if the percentage is less than 0.1%, the core parameters are reset to increase the value of NRSBT in order to operate the core more efficiently.

Step 7: If the percentage of NRSBT equals 0.1%, the assumed value of SLMCPR, which equals core MCPR, is the limit at which the core may operate, as shown by block 711.

Step 8: Since this process includes relatively uncertain simulations in steps 2 and 3, as shown by blocks 702 and 703, the change in CPR is evaluated at a 95% confidence interval, $\Delta CPR_{95/95}$. The OLMCPR equals the linear addition of the SLMCPR to the $\Delta CPR_{95/95}$. The resulting value of the OLMCPR complies with the USNRC regulations.

Motivated by the difficulties in calculating OLMCPR directly and the overly conservative approximation technique currently used, the inventors were led to examine more closely some of the processes conventionally used in evaluating BWR designs and calculating OLMCPR. For example, the following is a brief list summarizing two of the most prominent factors identified by the inventors as constraining the ability to calculate OLMCPR directly using the ideal method:

1. The number of calculations necessary to evaluate each AOO would be too cumbersome. To establish a statistically sound estimation of the NRSBT, approximately one hundred trials for each AOO would have to be performed. The currently-available equipment has inherent limitations that prevent the requisite number of transient calculations from being performed within the necessary timeframe.
2. The currently-available equipment cannot simulate local power distribution or the relative position of the rod within the fuel bundle (R-factor). The variations within each rod bundle are essential to compute an accurate NRSBT. Without a precise method of estimating the effects of the variations, a direct calculation of OLMCPR would be unavoidably inaccurate.

SUMMARY OF THE INVENTION

Due to the excessive degree of conservatism inherent in the conventional basis used for evaluation of BWR operations, a substantial increase in the operating margin for a BWR can be realized by using other approaches toward determining the OLMCPR. Applicants have developed a mathematically-sound approach to determining OLMCPR that allows for a substantial increase in the permissible operating margin for a reactor and increased operating efficiency, greater fuel generation and/or lowered fuel exhaustion. For example, demonstrating that a particular reactor or reactor design actually has a greater operational margin than may have been previously realized, e.g., due to the use of an unnecessarily conservative evaluation method, could permit operation at increased output power levels or at comparable power output levels using less fuel. Accordingly, a more mathematically-sound evaluation method that results in a substantially greater operational margin for Boiling Water Reactors is presented herein for calculating and demonstrating the OLMCPR.

Briefly, the improved method of the present invention is based on producing a histogram of the number of reactor fuel rods susceptible to operation at "boiling transition" temperatures over a range of variations in selected parametric quantities that are indicative of reactor design constraints and operating conditions. In addition, a core operational modeling approach using predetermined PDFs of the change in critical power ratio ($\Delta CPR/ICPR$) for each type of transient event specific to the type of BWR is employed for simulating BWR thermal hydraulics and neutron kinetics during an "anticipated operational occurrence" or AOO in the reactor (for example, a operational occurrence that causes a brief power transient). Basically, in the present invention, all model and reactor plant parameters that may affect the number of rods subject to boiling transition (NRSBT) are taken into account in projecting the PDF of the NRSBT. The NRSBT is then evaluated statistically in order to determine the OLMCPR directly without the need for first calculating a value for the SLMCPR. Using this approach, the present invention achieves a direct evaluation of OLMCPR of the reactor from a statistical analysis of histograms for the transient condition—as opposed the conventional "indirect" approach of determining an OLMCPR from a combination of values obtained by separately evaluating both a steady-state SLMCPR and the change in the critical power ratio ($\Delta CPR$) due to a transient operational occurrence.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIG. 1 is a schematic diagram of a simplified boiling water nuclear reactor.

FIG. 2 is a cross-sectional diagram depicting an arrangement of multiple fuel rod bundles within a core of a BWR.

FIG. 3 is a schematic cross-sectional diagram of an arrangement of fuel rods within a single fuel bundle.

FIG. 4 is a graph showing the determination of the NRSBT according to the ideal process.

DETAILED DESCRIPTION OF THE INVENTION

Figure 5:
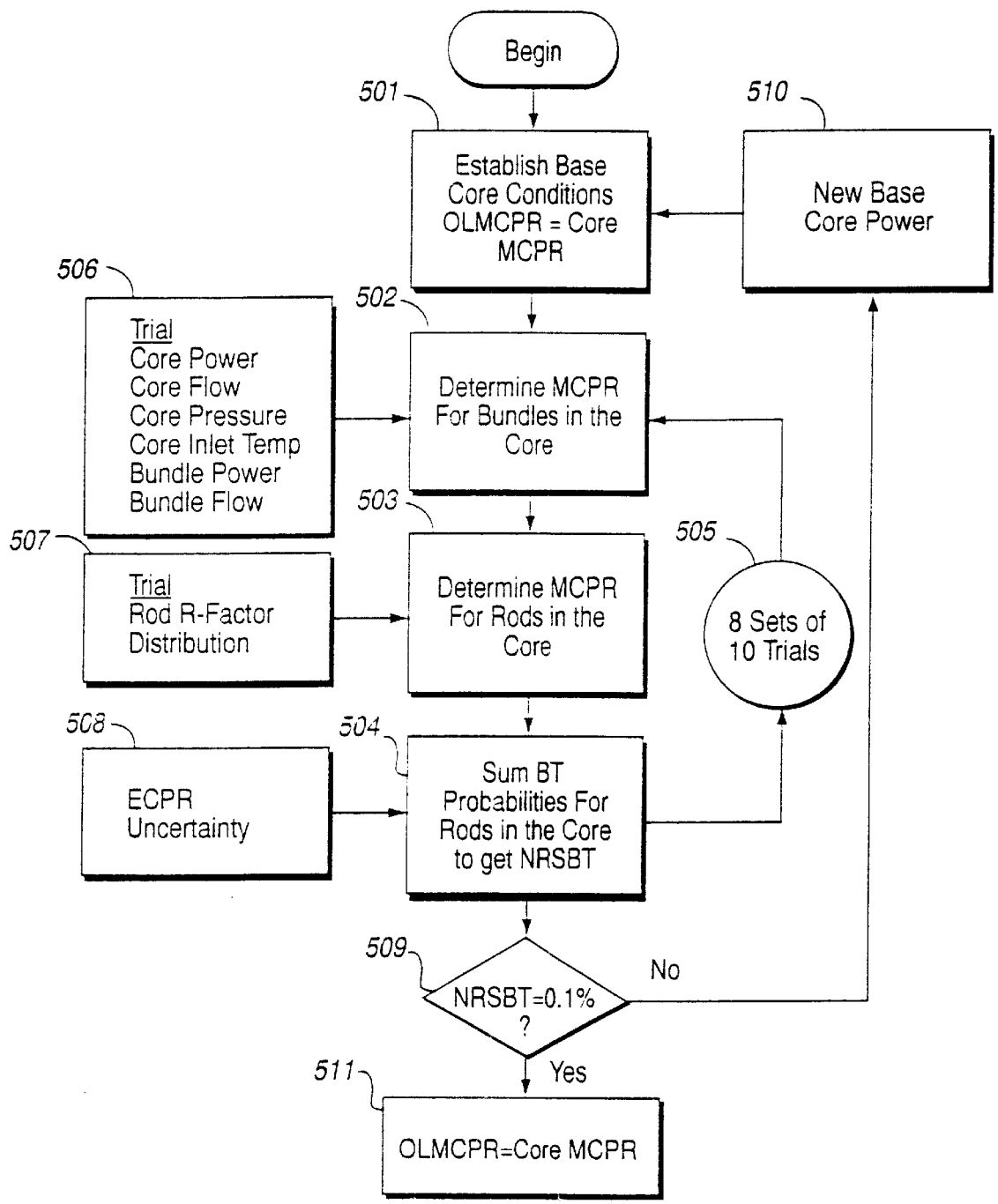
FIG. 5 is a flow chart illustrating a sequence of processing steps executable by a data processing system for performing an evaluation of OLMCPR using the ideal process.
Figure 6:
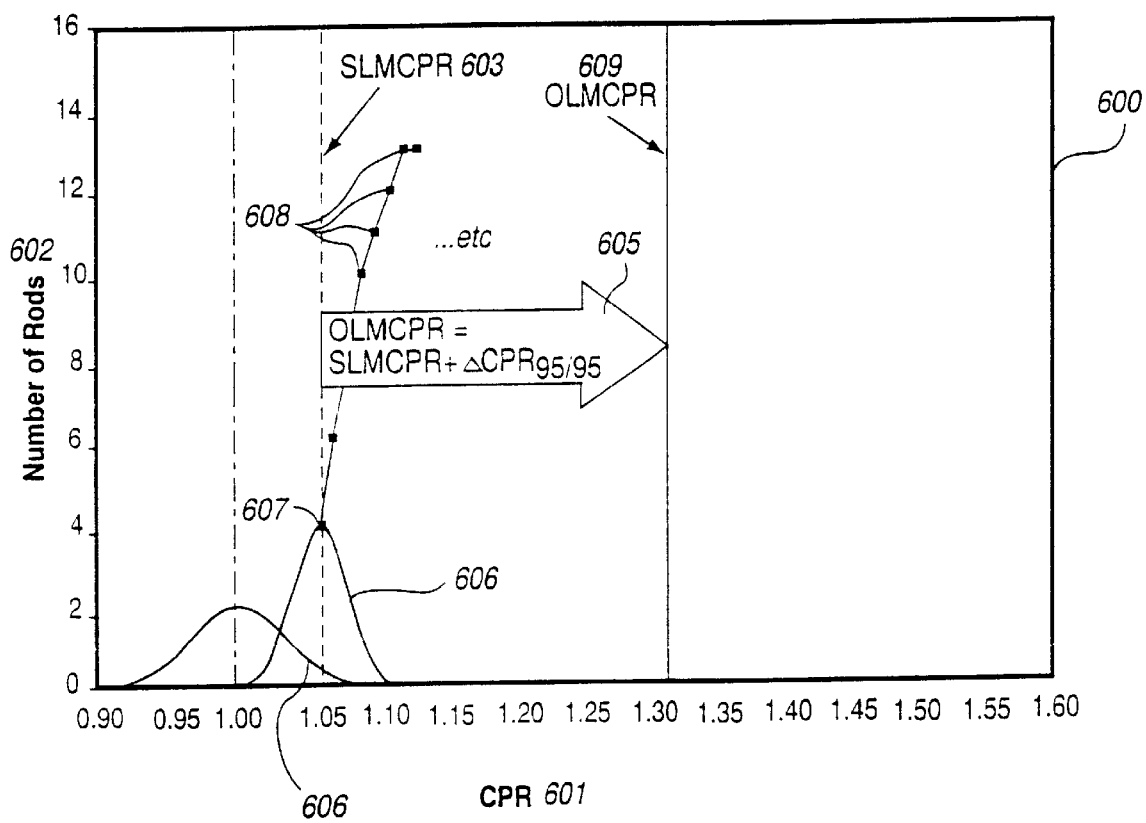
FIG. 6 is a graph showing the linear addition of $\Delta CPR$ to the SLMCPR to determine OLMCPR, which is the currently approved process.
Figure 7:
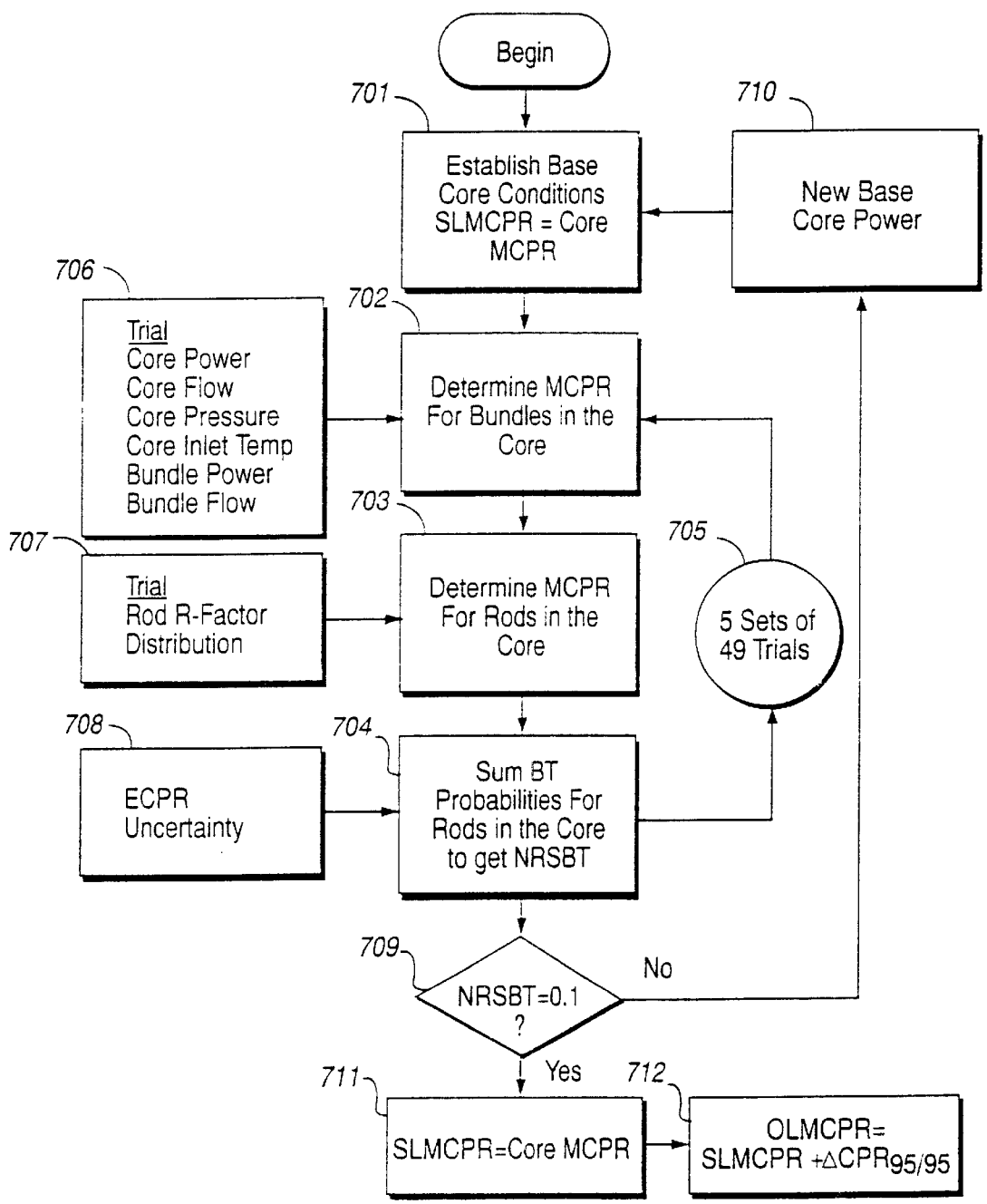
FIG. 7 is a flow chart illustrating a sequence of processing steps executable by a data processing system for performing a evaluation of the OLMCPR using the currently approved process.

A practical method for determining the operating limit minimum critical power ratio (OLMCPR) of a Boiling Water Reactor (BWR) nuclear core is disclosed here. This practical improvement results in the realization of greater operating margins for the core which in turn results in more efficient and cost effective core operation and/or configurations. This is a more direct approach towards demonstrating compliance of a nuclear reactor with USNRC licensing requirements than processes conventionally used for such purposes. A data processing system is disclosed including a computer having memory and various I/O or display devices that is specifically programmed for providing simulation of transient operational events in a BWR and for a subsequent compilation and display of one or more response histogram (s) that incorporate all the inherent "uncertainties" associated with reactor plant initial state conditions and other parameter(s) of interest or importance.

A method is used to calculate a generic bias in change in critical power ratio during a transient event ($\Delta$CPR/ICPR) and uses the resulting Probability Distribution Function (PDF) to predict a more accurate OLMCPR without first calculating a SLMCPR. From a large number of experimental trials that take many factors into account, a PDF for the transient $\Delta$CPR/ICPR is created and the standard deviation in $\Delta$CPR/ICPR is determined for each transient event. A nominal $\Delta$CPR/ICPR for the transient event starting from nominal initial conditions is also determined. Histograms of individual rod CPR values for the minimum point in the transient are created by drawing random values of initial CPR and transient $\Delta$CPR/ICPR uncertainty. The initial critical power ratios (ICPR) are converted, or translated, to MCPRs by a common random value of $\Delta$CPR/ICPR. From the MCPR values, the percentage of NRSBT is calculated for each trial. If the percentage of NRSBT is greater than 0.1%, initial operating conditions are changed and the process is repeated until the NRSBT is equal to 0.1%.

The NRSBT distribution histogram is analyzed using statistical methods to determine the "central tendency" of the distribution. Typically the mean or median is used as a statistic to quantify central tendency. The value of this statistic is defined here as the nominal value. In the discussions that follow, examples are given where the mean value is chosen as the nominal value although the present invention is not limited to this choice. Use of the median value or the value of some other statistic for central tendency as the nominal value is also contemplated as part of the present invention.

The uncertainty in the nominal value of the statistic that is used to quantify central tendency is expressed in terms of a "confidence interval" for the nominal value. A confidence interval is defined such that there is a specified probability (usually of 50% or greater) that the interval contains the nominal value. For example, a 95% probability that the interval bounds the mean, defines a 95% confidence interval for the mean. The specified probability used to establish this confidence interval is called the "level of confidence" or confidence level.

The susceptibility to boiling transition during the transient is quantified statistically as either (1) the probability that a single rod in the core is susceptible to boiling transition or (2) the expected fraction of total rods in the core susceptible to boiling transition. Such a statistical relationship is possible because each individual trial value of NRSBT has been determined by summing the probabilities that individual fuel rods have CFR values less than 1.0 during the transient. The nominal value for each NRSBT distribution can also by the present invention be associated with the distribution of initial rod CPR values for all fuel rods in the core. It is by this process that a relationship can be established between the minimal initial MCPR value for all fuel rods in the core and the probability and confidence level that the fuel rods will be susceptible to boiling transition during the transient. The minimal initial MCPR value for the core when determined in this way using the probability and confidence level established by the USNRC design basis requirement for the number of rods not susceptible to boiling transition during the AOO transient, is by definition, the minimum Operating Limit MCPR required to demonstrate compliance.

In accordance with one aspect, the present invention is a system including a data processing apparatus programmed to execute specific routines for simulating BWR core operating conditions and for calculating and statistically demonstrating the OLMCPR of a reactor in accordance with the improved method of the present invention as described in detail below.

Figure 8:
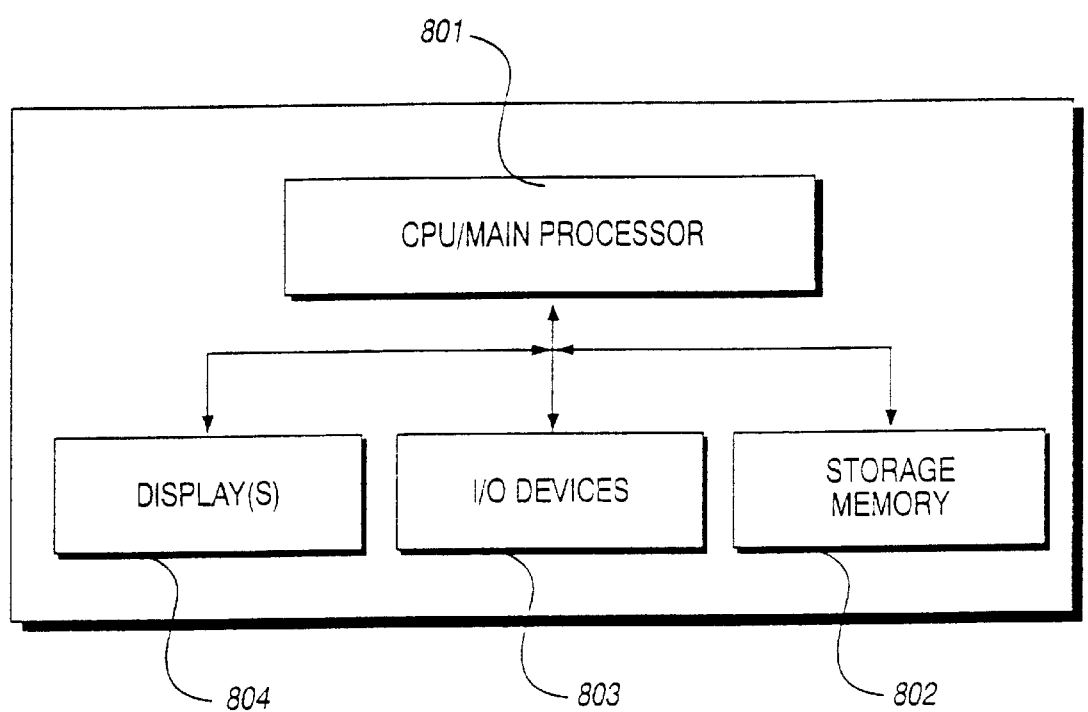
FIG. 8 is a block diagram of an example data processing system used for multi-dimension/modeling of BWR thermal hydraulics and indirect evaluation of an OLMCPR for a BWR in accordance with the present invention.

FIG. 8 shows a block diagram of an example data processing system, contemplated for performing the multi-dimensional simulation of reactor core transient response and for the direct evaluation of OLMCPR for a BWR reactor core in accordance with the present invention. Essentially, the system includes a central processing unit 801 (CPU), a storage memory 802, and a user interfacing I/O devices 803 and, optionally, one or more displays 804. Storage memory 802 includes a data base (not shown) of reactor plant state information, parameter values and routines for implementing multi-dimensional simulations of core operating conditions and evaluating OLMCPR in accordance with the improved method of the present invention as described herein below.

A statistical study is performed for each type of AOO, for each a ass of BWR plant type, and for each fuel type to predetermine the generic transient bias and uncertainty in the $\Delta$CPR/ICPR. Enough trials (on the order of one hundred) are made starting with the nominal initial conditions, using random variations in the model and plant parameters. Uncertainties in initial conditions that contribute to $\Delta$CPR/ICPR (e.g., core power) are also included in the perturbations. The data are utilized to determine bias and standard deviation on the transient $\Delta$CPR/ICPR.

Figure 9:
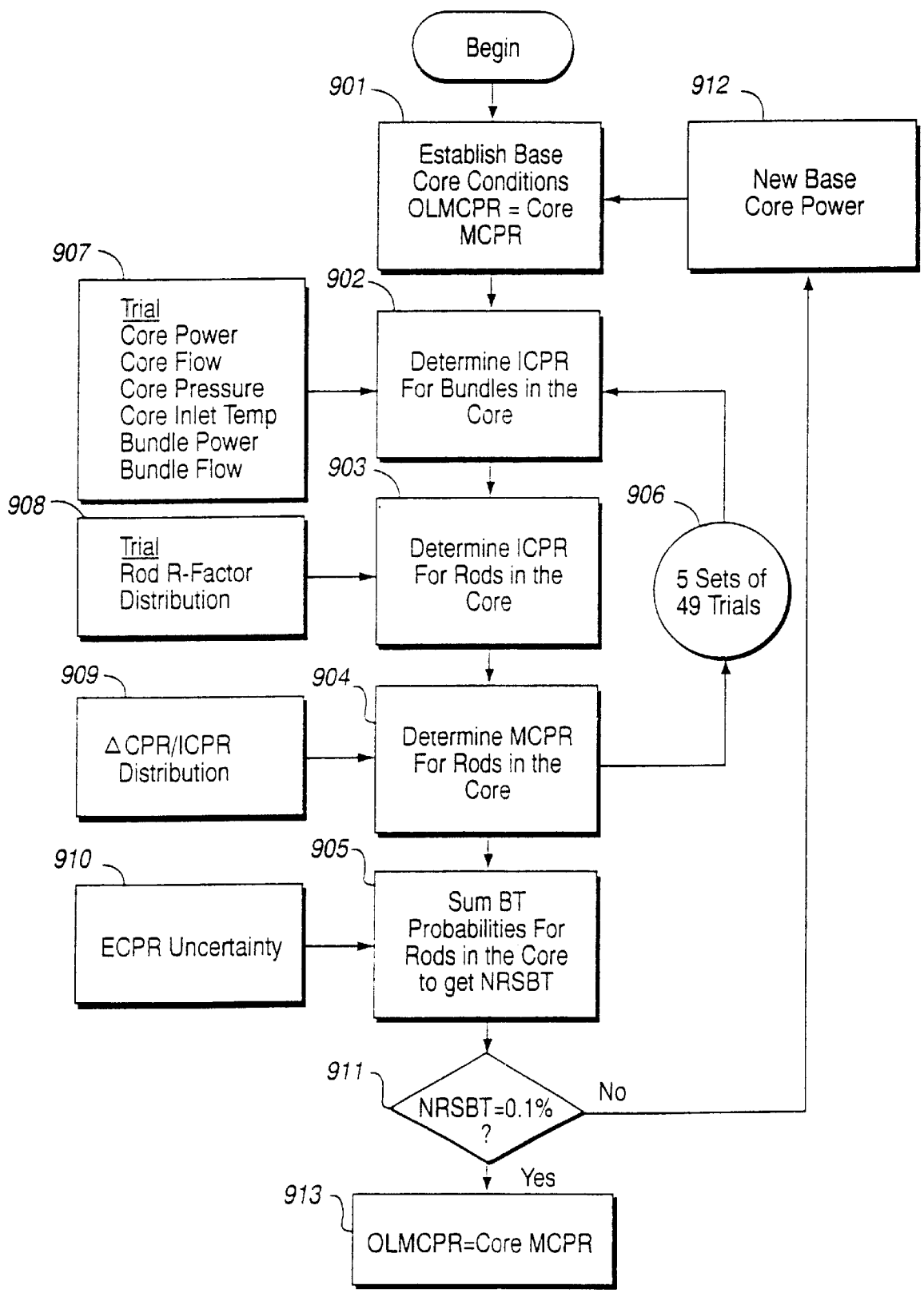
FIG. 9 is a flow chart illustrating a sequence of processing steps used in calculating the OLMCPR using the generic uncertainty in $\Delta CPR/ICPR$.
Figure 10:
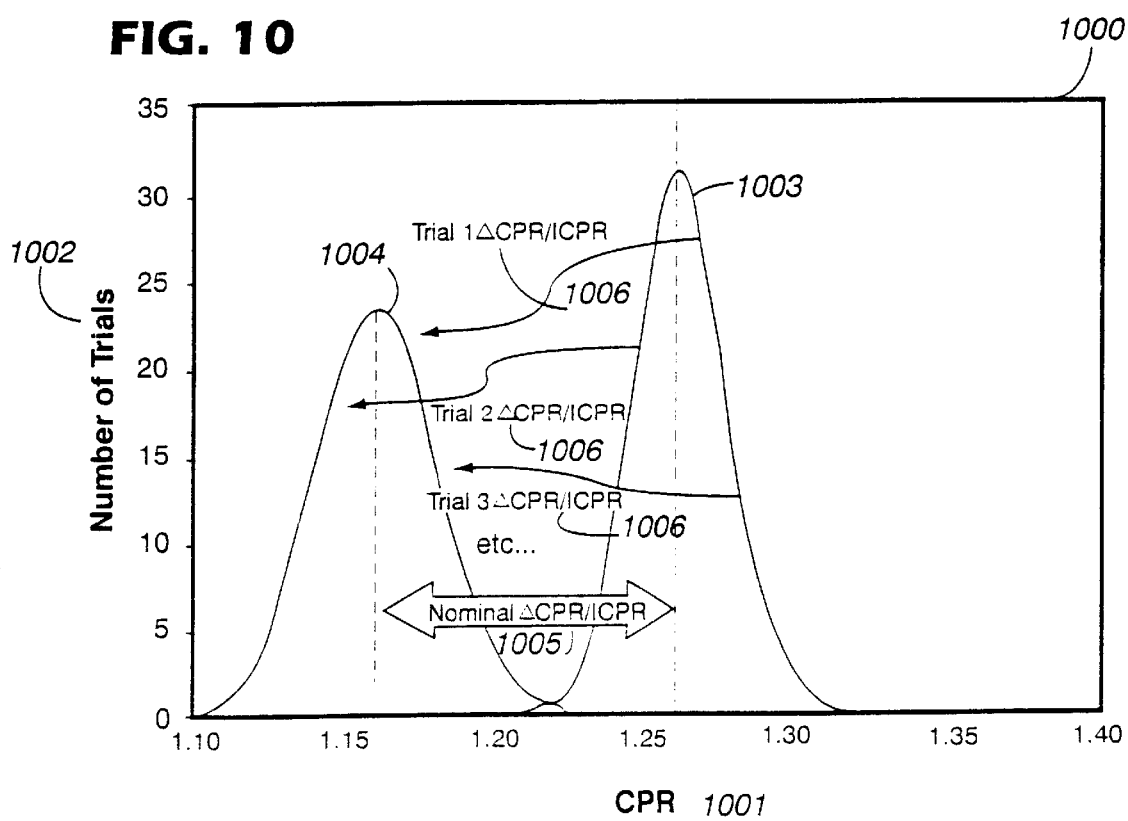
FIG. 10 is a graph showing the determination of generic uncertainty in $\Delta CPR/ICPR$ using the present invention.

A flow chart for the process of the present invention is shown in FIG. 9. Block 909 remains unvaried throughout the calculation of the OLMCPR, and the $\Delta$CPR/ICPR for individual transient events for each reactor type and fuel type must be determined before the process is used. FIG. 10 shows the resulting graph of $\Delta$CPR/ICPR for one specific type of AOO. Histogram 1000 shows the number of trials 1002 with a resulting CPR 1001 for each rod versus the corresponding CPR 1001 values. The PDF 1003 represents the distribution of CPR before the transient event. Each CPR value then changes according to individual $\Delta$CPR/ICPR 1006 values. The aggregate of the transient CPR values yields the PDF 1004 during the transient event. The nominal $\Delta$CPR/ICPR 1005 is defined to be the difference in the nominal CPR value of the PDF 1003 and the nominal CPR value of the PDF 1004. The calculation of the OLMCPR is as follows.

Step 1: Assume a set of base core operating conditions using the parameters to run the plant generates a core MCPR equal to the OLMCPR as shown by block 901.

Step 2: Using the parameters, such as core power, core flow, core pressure, bundle power and others, that predict a general bundle CPR set forth in block 907, determine the ICPR for each bundle in the core, as shown by block 902.

Step 3: Using parameters, such as rod placement within each bundle and rod power distribution, that change each bundle CPR into individual rod CPR values set forth in block 908, determine the ICPR for each rod in the core, as shown by block 903.

Figure 11:
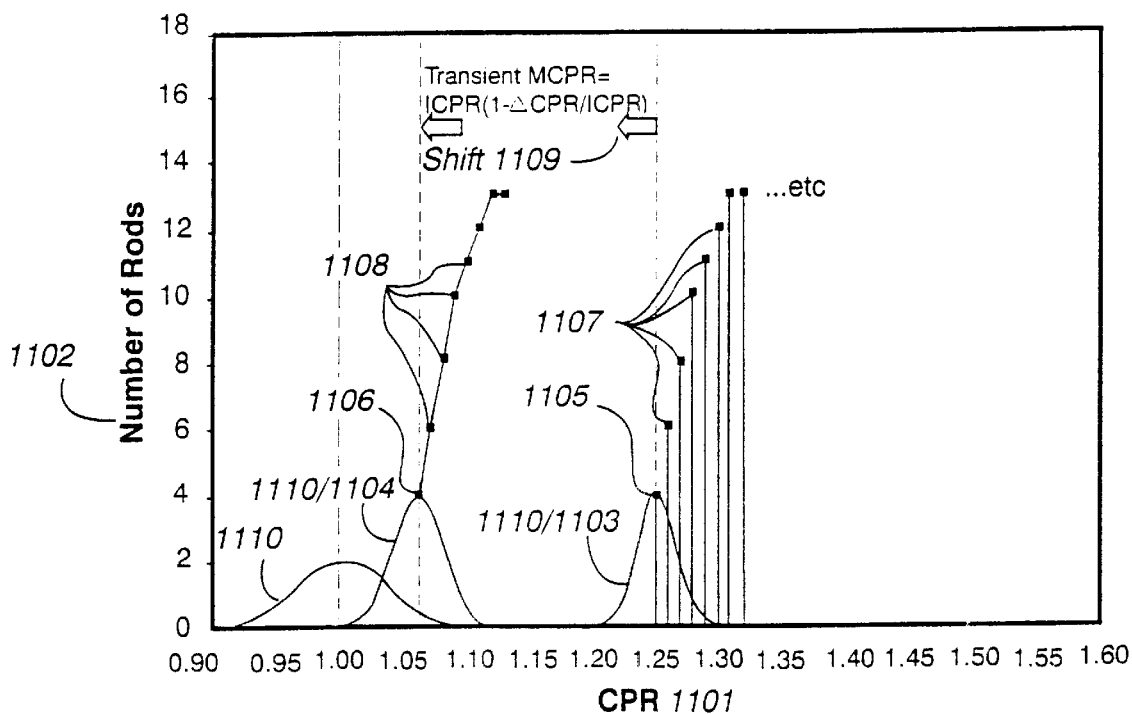
FIG. 11 is a graph showing the determination of the NRSBT using the generic uncertainty of $\Delta CPR/ICPR$.

Step 4: Using a randomly drawn individual ΔCPR/ICPR 1006 value from the graph of the appropriate transient represented in FIG. 10, MCPR values are projected for corresponding values of ICPR according to Equation 4. In FIG. 11, this process is represented by Shift 1109. FIG. 11 shows the number of rods at a specific CPR value 1102 versus the corresponding CPR value 1101. The histogram 1107 is translated to histogram 1108 during the transient using a randomly selected ΔCPR/ICPR 1006 value. Lowest CPR value 1105 becomes lowest CPR value 1106, and lowest CPR rod PDF 1103 becomes lowest CPR rod 1104.

$$MCPR_1 = ICPR_1\left(1 - \left(\frac{\Delta CPR}{ICPR}\right)_i\right) \quad \text{(Equation 4)}$$

Step 5: Using the ECPR probability distribution shown as PDF 1104 and set forth in block 910, determine the percentage of NRSBT in the core by summing the probabilities of each rod in the core that is subject to boiling transition as shown by block 905. This summation is performed using Equation 3, shown above.

Step 6: Vary the parameters set forth in blocks 907 and 908 for a set number of Monte Carlo statistical trials as shown by block 906. Compile the statistics from all the trials from steps 2 through 5 to generate a probability distribution of NRSBT.

Step 7: Compare the value of percentage of NRSBT to 0.1% as shown in block 911. If the percentage is greater than 0.1%, reset the core parameters to different initial conditions in order to comply with the USNRC regulations as shown in block 912. Similar to Step 1 and block 901, the new initial conditions are assumed to generate the OLMCPR. The determination of NRSBT restarts and runs until the value of NRSBT is equal to 0.1%. Similarly, if the percentage is less than 0.1%, the core parameters are reset to increase the value of NRSBT in order to operate the core more efficiently or to reduce effluents.

Step 8: If the percentage of NRSBT equals 0.1%, the assumed value of OLMCPR, which equals core MCPR, complies with the USNRC regulations as shown by block 913. Accordingly, the operating core conditions are set as the assumed parameters.

Two assumptions are made for the above estimation of OLMCPR. First, in performing step 4, shown in FIG. 11 as shift 1109 and in FIG. 9 as block 904, the inventors assume that random draws from the ΔCPR/ICPR distribution are permissible for a perturbation in the initial conditions. Therefore, variations in ΔCPR/ICPR must be independent of perturbations in initial conditions or have a negative correlation, so that the interaction tends to diminish the individual effects. Second, in performing step 4, the inventors assume that the transient change in the ΔCPR/ICPR applies to all rods.

A demonstration analysis shows that the ΔCPR/ICPR is not sensitive to the uncertainty in core power, core flow, core pressure, feedwater temperature, and rod peaking factor (R-factor). Of these, one of the most important parameters in the currently approved process is core power. This parameter actually results in an effect opposite the effect on ICPR. If the power increases, the ICPR will decrease but the ΔCPR/ICPR will also decrease. This will result in an MCPR that would be higher than derived through the currently approved process. Another conservative factor is the intended use of the nominal ΔCPR/ICPR. If the core was adjusting to a limiting rod pattern to maximize the number of contributing bundles, as is done for the currently approved process, the ΔCPR/ICPR is 4% lower.

TABLE 1

IMPACT OF CRITICAL ICPR UNCERTAINTIES ON ΔCPR/ICPR

| Quantity | Uncertainty in Quantity | ΔCPR/ICPR impact at 1σ (%) |
|---|---|---|
| Total Core Power | +1σ = +2% | −0.6% |
|  | −1σ = −2% | +0.7% |
| Total Core Flow | +1σ = +2.5% | +4.4% |
|  | −1σ = −2.5% | −0.2% |
| Steam Dome Pressure | +1σ = +0.7% | −0.5% |
|  | −1σ = −0.7% | +0.6% |
| Feedwater Temperature | +1σ = +0.8% | +0.3% |
|  | −1σ = −0.8% | −0.3% |
| R-factor | +1σ = +1.6% | −0.5% |
|  | −1σ = −1.6% | +0.5% |
| Radial Power Distribution (increase radial peaking with SLMCPR type limiting rod pattern) | +1σ = 3.19% | −5.0% |
| (column 101) | (column 102) | (column 103) |

Table 1 shows the impact of uncertainty in critical ICPR values on ΔCPR/ICPR values. Column 101 lists the critical parameter quantities that affect the ΔCPR/ICPR. Column 102 lists the percentage uncertainty of each parameter corresponding to the standard deviation of the associated PDF. σ is the standard deviation of the PDF corresponding to the uncertainty in parameter quantity. Column 103 lists the change in the ΔCPR/ICPR corresponding to a change of one standard deviation of each parameter.

The ΔCPR/ICPR is not sensitive to the other unknown parameter in the currently approved process. The axial power distribution is also part of the local power distribution (TIP uncertainty) calculation in the currently approved process. For a very large change in axial power shape (nearly two times higher power in the bottom of the bundle), the sensitivity to ΔCPR/ICPR is less than 2%, which is insignificant.

The other assumption to be validated is that a constant value of ΔCPR/ICPR can be applied to rods at different ICPR values. As described above, the transient MCPR distribution will be obtained by transforming the ICPR distribution using Equation 4.

To further validate this assumption, a specific set of calculations were performed. Benchmark calculations were made for a transient event that included the uncertainties in core power and channel pressure drop as initial conditions, as well as uncertainties in the model. Core power and channel pressure drop uncertainties were chosen, because they are the only currently approved process compatible uncertainties that are also varied in generating the generic uncertainty probability distribution function. MCPR distributions during the transient were generated for two fuel bundles in the core through ninety-eight transient calculations. The two bundles are very close in ICPR values and have identical ΔCPR/ICPR values.

Figure 12:
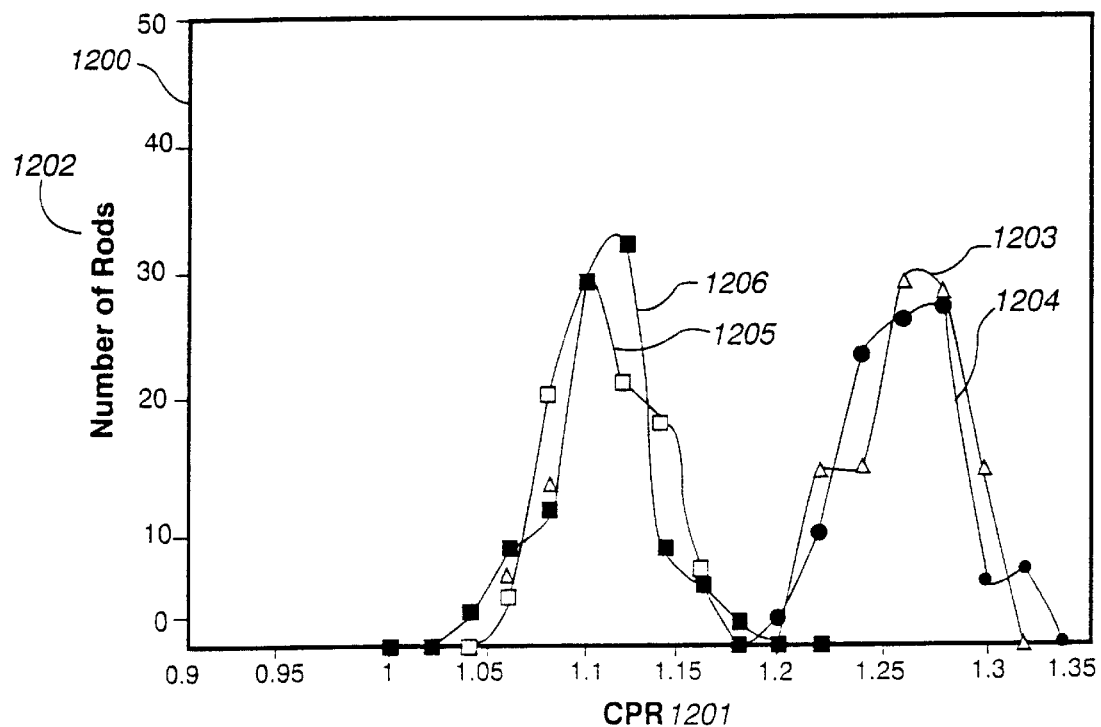
FIG. 12 is a graph showing the comparison of the process of the present invention to the ideal process.

To verify the translation process, ninety-eight Monte Carlo calculations were then performed where only the core power and pressure drop were varied to generate a PDF of ICPRs at the initial operating state. FIG. 12 shows histogram 1200, which is the number of rods 1202 at a certain CPR versus the corresponding CPR 1201 value. PDF 1203 is the ICPR distribution that was created using the Monte Carlo calculations varying core power and pressure drop. PDF 1205 is the corresponding transient MCPR distribution after the process of the invention transformation was applied. PDF 1204 is the reference ICPR distribution. PDF 1206 is the transient MCPR distribution when applying the currently approved process. PDF 1205 and PDF 1206 are very similar in both the most probably value of MCPR and the associated standard deviation of each distribution. Since there is a strong resemblance between the two resulting MCPR distributions, the transformation using the process of the invention is valid.

It has been demonstrated that: (1) the ΔCPR/ICPR is independent relative to the uncertainties that affect the ICPR, or the covariance is such that it is conservative to assume independence and (2) the transient MCPR distribution can be determined by applying the transient ΔCPR/ICPR uncertainty to the rod ICPR distribution using the proposed approach.

Figure 13:
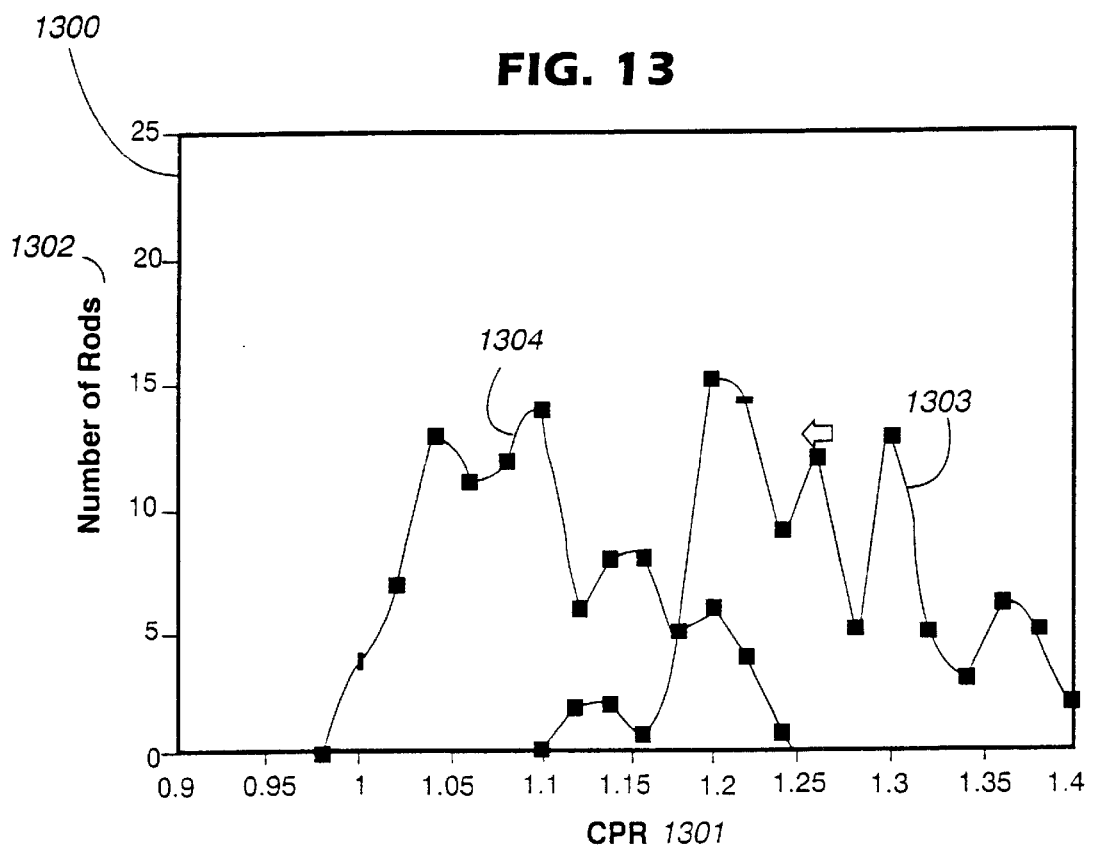
FIG. 13 is a graph showing the transformation of ICPR distribution to transient MCPR.

An example of the process of the invention is described by FIG. 13. In FIG. 13, histogram 1300 shows the number of rods 1302 of a certain CPR value versus the corresponding CPR value 1301. The PDF 1303 shows the resulting ICPR values from a set of approximately ninety-eight ICPR trials with all uncertainties applied. Ninety-eight new trials were run to generate a ΔCPR/ICPR distribution for the specific transient event in order to translate the ICPR values to MCPR values. This ΔCPR/ICPR distribution is not shown in FIG. 13. The ΔCPR/ICPR distribution was applied using the process of the invention to the ICPR PDF 1303 to obtain the MCPR PDF 1304. The NRSBT was determined using the process of the invention, and the OLMCPR was determined to be 1.26. As a comparison, using the currently approved process, the SLMCPR was determined to be 1.10. Thus, the process described herein is more conservative than the first stage of the currently approved process. Ultimately, however, the currently approved process generates a unnecessarily conservative value after the error factor is added to the SLMCPR value, which yields a OLMCPR value needlessly larger than the process of the invention.

Although the improved methods, as described herein below, are preferably implemented using a high speed data processing system capable of processing simulation routines that require highly accurate calculations and multiple reiterations, the present invention is not intended as limited to any one particular type of computer or data processing system. Any generic data processing system having sufficient, speed, storage memory and programmable computational capabilities for implementing statistical data analysis/reduction may be utilized to implement the present invention.

What is claimed is:

1. A method for determining an operating margin for a nuclear fuel core of a particular Boiling Water Reactor (BWR), wherein fuel design or core configuration are contingent upon an operating margin for the reactor, said operating margin being determined by a process for evaluating an operating limit minimum critical power ratio (OLMCPR), comprising:

a) determining a generic transient change-in-critical-power-ratio (ΔCPR/ICPR) distribution of values, wherein said generic transient ΔCPR/ICPR distribution is based at least upon a pre-computed nominal ΔCPR/ICPR bias value and an ΔCPR/ICPR uncertainty;

b) determining initial critical power ratios (ICPRs) for each fuel rod in the core corresponding to a particular BWR plant;

c) determining a plurality of transient Minimum CPRs (MCPRs) for all fuel rods in the fuel core by applying the generic transient ΔCPR/ICPR distribution to each ICPR determined in (b); and d) effecting said Boiling Water Reactor operation by applying a selected OLMCPR as an operational control parameter, said OLMCPR selected for the particular BWR by computing a mean NRSBT (number of fuel rods subject to boiling transition) corresponding to a histogram of said plurality of transient Minimum CPRS and selecting an OLMCPR value as a transient Minimum CPR which results in a corresponding mean NRSBT value that is less than a predetermined cutoff value.

2. The method of claim 1 wherein the pre-computed nominal ΔCPR/ICPR bias value and uncertainty is determined by conventional statistical analysis of one or more computer simulations of at least one type of reactor transient operational occurrence for a least one class of BWR plant type and for at least one fuel type.

3. The method of claim 1 wherein said ICPRs are determined for a particular transient event during a particular fuel cycle.

4. A method for determining an operating margin for a nuclear fuel core of a particular Boiling Water Reactor (BWR), wherein fuel design or core configuration are contingent upon an operating margin for the reactor, said operating margin being determined by a process for evaluating an operating limit minimum critical power ratio (OLMCPR), comprising:

determining initial critical power ratios (ICPRs) for each fuel rod in a fuel core of the particular BWR;

using a predetermined generic transient change-in-critical-power-ratio (ΔCPR/ICPR) distribution of values to compute transient Minimum CPRs (MCPRs) for all fuel rods in the fuel core based upon said ICPRs;

computing a mean NRSBT (number of fuel rods subject to boiling transition) corresponding to a histogram of said transient Minimum CPRs;

selecting an operating limit minimum critical power ratio OLMCPR) for the BWR from a histogram of fuel rod transient Minimum CPUs for a particular set of initial conditions that result in a mean NRSBT value that is less than a predetermined cutoff value.

5. The method of claim 4 wherein e predetermined generic transient ×CPR/ICPR distribution of values is determined by statistical analysis of one or more computer simulations of at least one type of reactor transient operational occurrence for a least one class of BWR plant type and for at least one fuel type.

* * * * *

UNITED STATES PATENT AND TRADEMARK OFFICE
CERTIFICATE OF CORRECTION

PATENT NO. : 6,674,825 B2
DATED : January 6, 2004
INVENTOR(S) : Bolger et al.

It is certified that error appears in the above-identified patent and that said Letters Patent is hereby corrected as shown below:

Column 1,
Line 35, amend "N ideate" to read -- Nucleate --
Line 41, amend "PS" to read -- drops --
Line 42, amend "temperance" to read -- temperature --

Column 2,
Line 22, amend "In the core" to read -- in the core --
Line 31, amend "cc in" to read -- certain --
Line 37, amend "et at." to read -- et al. --
Line 39, amend "40 of rod CPR values" to read -- 400 of rod CPR values --
Line 40, amend "CFR value." to read -- CPR value. --
Line 45, amend "Is used to" to read -- is used to --

Column 3,
Lines 37 and 40, amend "$P_1$" to read -- $P_i$ --

Column 4,
Line 33, amend "SLMCFR" to read -- SLMCPR --
Line 47, amend "b die" to read -- bundle --

Column 8,
Line 1, amend "CFR values" to read -- CPR values --
Line 36, amend "a ass" to read -- class --

Signed and Sealed this

Thirteenth Day of April, 2004

JON W. DUDAS
*Acting Director of the United States Patent and Trademark Office*